US 12,307,786 B2

United States Patent
Kaku et al.

(10) Patent No.: US 12,307,786 B2
(45) Date of Patent: May 20, 2025

(54) SYSTEMS AND METHODS FOR DETECTING LANES USING A SEGMENTED IMAGE AND SEMANTIC CONTEXT

(71) Applicant: Toyota Research Institute, Inc., Los Altos, CA (US)

(72) Inventors: Shunsho Kaku, Mountain View, CA (US); Jeffrey M. Walls, Ann Arbor, MI (US); Jie Li, Los Altos, CA (US); Kun-Hsin Chen, Mountain View, CA (US); Steven A. Parkison, Ann Arbor, MI (US)

(73) Assignees: Toyota Research Institute, Inc., Los Altos, CA (US); Toyota Jidosha Kabushiki Kaisha, Toyota (JP)

(*) Notice: Subject to any disclaimer, the term of this patent is extended or adjusted under 35 U.S.C. 154(b) by 316 days.

(21) Appl. No.: 17/873,263

(22) Filed: Jul. 26, 2022

(65) Prior Publication Data

US 2024/0037961 A1 Feb. 1, 2024

(51) Int. Cl.
*G06V 20/56* (2022.01)
*G06T 7/11* (2017.01)
(Continued)

(52) U.S. Cl.
CPC ............ *G06V 20/588* (2022.01); *G06T 7/11* (2017.01); *G06T 7/246* (2017.01); *G06T 7/50* (2017.01); *G06T 2207/30256* (2013.01)

(58) Field of Classification Search
CPC ........ G06V 20/588; G06T 2207/30256; G06T 7/11; G06T 7/246; G06T 7/50; G06T 2207/20084; G06T 7/73
See application file for complete search history.

(56) References Cited

U.S. PATENT DOCUMENTS

| | | | |
|---|---|---|---|
| 11,774,261 B2* | 10/2023 | Averilla | G01S 17/931 |
| | | | 701/450 |
| 2016/0180177 A1* | 6/2016 | Nguyen | G06V 10/42 |
| | | | 382/104 |

(Continued)

FOREIGN PATENT DOCUMENTS

| | | |
|---|---|---|
| CN | 111707277 A | 9/2020 |
| CN | 113569774 A | 10/2021 |

(Continued)

OTHER PUBLICATIONS

Liu et al., "Lane detection in complex scenes based on end-to-end neural network," 2020 Chinese Automation Congress (CAC), 2020, pp. 4300-4305.

(Continued)

*Primary Examiner* — Bobbak Safaipour
*Assistant Examiner* — Michael Kim Maiden
(74) *Attorney, Agent, or Firm* — Christopher G. Darrow; Darrow Mustafa PC

(57) ABSTRACT

Systems, methods, and other embodiments described herein relate to the detection of lanes in a driving scene through segmenting road regions using an ontology enhanced to derive semantic context. In one embodiment, a method includes segmenting an image of a driving scene, independent of maps, by lane lines and road regions defined by an ontology and a pixel subset from the image has semantics of lane information from the ontology. The method also includes computing pixel depth from the image for the lane lines and the road regions using a model. The method also includes deriving 3D context using relations between the semantics and the pixel depth, the relations infer a driving lane for a vehicle from types of the lane lines and the road regions adjacent to the driving lane. The method also (Continued)

includes executing a task to control the vehicle on the driving lane using the 3D context.

20 Claims, 6 Drawing Sheets

(51) Int. Cl.
*G06T 7/246* (2017.01)
*G06T 7/50* (2017.01)

(56) References Cited

U.S. PATENT DOCUMENTS

| | | | |
|---|---|---|---|
| 2020/0098135 A1* | 3/2020 | Ganjineh | G06V 20/582 |
| 2022/0221279 A1* | 7/2022 | Goldman | G01C 21/3811 |

FOREIGN PATENT DOCUMENTS

| | | |
|---|---|---|
| CN | 113762004 A | 12/2021 |
| CN | 113822149 A | 12/2021 |
| CN | 113903015 A | 1/2022 |
| EP | 3920128 A1 | 12/2021 |
| WO | 2021233165 A1 | 11/2021 |

OTHER PUBLICATIONS

Wang et al., "LaneNet: Real-Time Lane Detection Networks for Autonomous Driving," arXiv:1807.01726, Jul. 4, 2018, pp. 1-9.
Yoo et al., "End-to-End Lane Marker Detection via Row-wise Classification," Proceedings of the IEEE/CVF Conference on Computer Vision and Pattern Recognition (CVPR) Workshops, 2020, pp. 1006-1007.
Fang et al., "ContinuityLearner: Geometric Continuity Feature Learning for Lane Segmentation," arXiv:2108.03507, Aug. 7, 2021, pp. 1-7.
Patra et al., "A Joint 3D-2D based Method for Free Space Detection on Roads," 2018 IEEE Winter Conference on Applications of Computer Vision (WACV), 2018, pp. 643-652.
Zhou et al., "Automatic Construction of Lane-level HD Maps for Urban Scenes," 2021 IEEE/RSJ International Conference on Intelligent Robots and Systems (IROS), 2021, pp. 6649-6656.

* cited by examiner

SYSTEMS AND METHODS FOR DETECTING LANES USING A SEGMENTED IMAGE AND SEMANTIC CONTEXT

TECHNICAL FIELD

The subject matter described herein relates, in general, to detecting lanes using an image, and, more particularly, to detecting lanes in a driving scene through segmenting the image by road regions using an ontology enhanced for deriving semantic context.

BACKGROUND

Vehicles are equipped with sensors that provide data for perceiving other vehicles, obstacles, pedestrians, and additional aspects of a surrounding environment. For example, a vehicle is equipped with a light detection and ranging (LIDAR) sensor that uses light to scan the surrounding environment. A system having logic associated with the LIDAR analyzes acquired data to detect the presence of objects and other features of the surrounding environment. Furthermore, a system can use a camera for acquiring data about the surrounding environment to derive awareness about aspects of a driving scene. Sensor data can also be useful in various circumstances for improving perceptions of the surrounding environment so that systems such as automated driving systems (ADS) can assist or navigate the vehicle accurately.

In various implementations, systems use sensor and camera data to detect road attributes (e.g., lane lines). These systems may also use map data for accuracy in detecting the road attributes, especially in safety applications. For example, fine details in high-definition (HD) map data improve the accuracy of tasks computed by vehicle systems at the expense of increased computational costs and complexity as a trade-off. In addition, HD map data is sometimes unavailable or stale for a geographic area. Systems detecting inaccurate road attributes create unsafe scenarios, particularly for risky encounters through intersections, and frustrate vehicle operators.

SUMMARY

In one embodiment, example systems and methods relate to improving the detection of lanes in a driving scene through segmenting road regions using an ontology enhanced to derive semantic context. In various implementations, systems that detect lanes rely on map and sensor data to identify line attributes. However, map data can be unavailable in certain areas and increase computation costs due to data complexity from topological details. Furthermore, systems identifying line attributes may misinterpret road topologies involving bike lanes, multi-point intersections, and so on. Therefore, in one embodiment, a detection system uses an ontology enhanced for lane segmentation by region in a model that processes an image (e.g., monocular image) without map data. In particular, the detection system segments an image of a driving scene by lane lines and road regions defined by the ontology. The processed segments identify semantics of lane information (e.g., ego lane, bike lane, etc.) by pixel within the image. In one approach, the detection system computes pixel depth from the image using a model (e.g., flat-ground, mono-depth, etc.) that improves the accuracy of the semantic identification. Furthermore, the detection system may derive three-dimensional (3D) context using spatial relations by inferences made through the semantics and pixel depth information. For instance, the 3D context identifies that between lane regions there should be a lane line, neighboring lanes share lane lines, intersections and lanes share lines, and so on. Accordingly, the detection system accurately identifies lanes and 3D context for downstream tasks (e.g., motion planning) without directly using map data, thereby improving computational costs and system availability.

In one embodiment, a detection system to detect lanes in a driving scene through segmenting road regions using an ontology enhanced to derive semantic context is disclosed. The detection system includes a processor and memory storing instructions that, when executed by the processor, cause the processor to segment an image of a driving scene, independent of maps, by lane lines and road regions defined by an ontology and a pixel subset from the image has semantics of lane information from the ontology. The instructions also include instructions to compute pixel depth from the image for the lane lines and the road regions using a model. The instructions also include instructions to derive 3D context using relations between the semantics and the pixel depth, and the relations infer a driving lane for a vehicle from the types of the lane lines and the road regions adjacent to the driving lane. The instructions also include instructions to execute a task to control the vehicle on the driving lane using the 3D context.

In one embodiment, a non-transitory computer-readable medium to detect lanes in a driving scene through segmenting road regions using an ontology enhanced to derive semantic context and including instructions that when executed by a processor cause the processor to perform one or more functions is disclosed. The instructions include instructions to segment an image of a driving scene, independent of maps, by lane lines and road regions defined by an ontology and a pixel subset from the image has semantics of lane information from the ontology. The instructions also include instructions to compute pixel depth from the image for the lane lines and the road regions using a model. The instructions also include instructions to derive 3D context using relations between the semantics and the pixel depth, and the relations infer a driving lane for a vehicle from types of the lane lines and the road regions adjacent to the driving lane. The instructions also include instructions to execute a task to control the vehicle on the driving lane using the 3D context.

In one embodiment, a method for the detection of lanes in a driving scene through segmenting road regions using an ontology enhanced to derive semantic context is disclosed. In one embodiment, the method includes segmenting an image of a driving scene, independent of maps, by lane lines and road regions defined by an ontology and a pixel subset from the image has semantics of lane information from the ontology. The method also includes computing pixel depth from the image for the lane lines and the road regions using a model. The method also includes deriving 3D context using relations between the semantics and the pixel depth, the relations infer a driving lane for a vehicle from types of the lane lines and the road regions adjacent to the driving lane. The method also includes executing a task to control the vehicle on the driving lane using the 3D context.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the detection of lanes in a driving scene through segmenting road regions using an ontology enhanced to derive semantic context are disclosed herein. In various implementations, vehicles that detect lanes rely on map, sensor, and sometimes remote data to identify line characteristics. However, map data can be unavailable in certain areas (e.g., rural). Additionally, high definition (HD) maps increase computation costs from topology and detail complexity. Furthermore, systems can misinterpret road topologies involving bike lanes, complex intersections, and so on from line attributes identifying odd shapes. Therefore, in one embodiment, a detection system segments an image by lane lines and road regions for inferring semantics of lane information without direct map data using an enhanced ontology. A camera (e.g., monocular camera) may generate the image or frame for transformation into a vehicle frame that reduces processing costs associated with pixel-by-pixel semantic segmentation. In one approach, the pixel values for the driving scene are derived through segmentation according to the ontology and arranged in a vector describing relationships between various lane lines and road regions. Furthermore, the detection system computes depth using the image by a separate two-dimensional to three-dimensional (2D-to-3D) lifting operation or as part of segmentation tasks. The derived depth has information at an individual pixel level to distinguish a road, lane lines, a vehicle, and so on pixel-by-pixel.

Moreover, the detection system derives 3D context using relations between lane lines, road regions, lane regions, and intersection pixels by applying the enhanced ontology. In one approach, the semantic context is a 2D context generated before processing depth information by pixel. The detection system derives 3D context using a 3D computation head according to the 2D context. The detection system can also compute the 3D context while performing segmentation by integrating depth operations, thereby avoiding having an extra head for the 3D computation. As an example of a contextual inference, the detection system locates an ego-lane since there is a road region between two consecutive lane-lines within a standardized distance that are of different colors (e.g., white, yellow, etc.). Furthermore, the vehicle uses the 3D context for downstream tasks such as computing a distance gap, predicting velocity, and so on by an automated driving module. The 3D context can also identify abnormal conditions for a safety system to assist or warn a vehicle operator. Accordingly, the detection system improves system performance and compatibility while balancing system resources by applying the enhanced ontology for semantic segmentation and inferring 3D context using depth operations.

Figure 1:
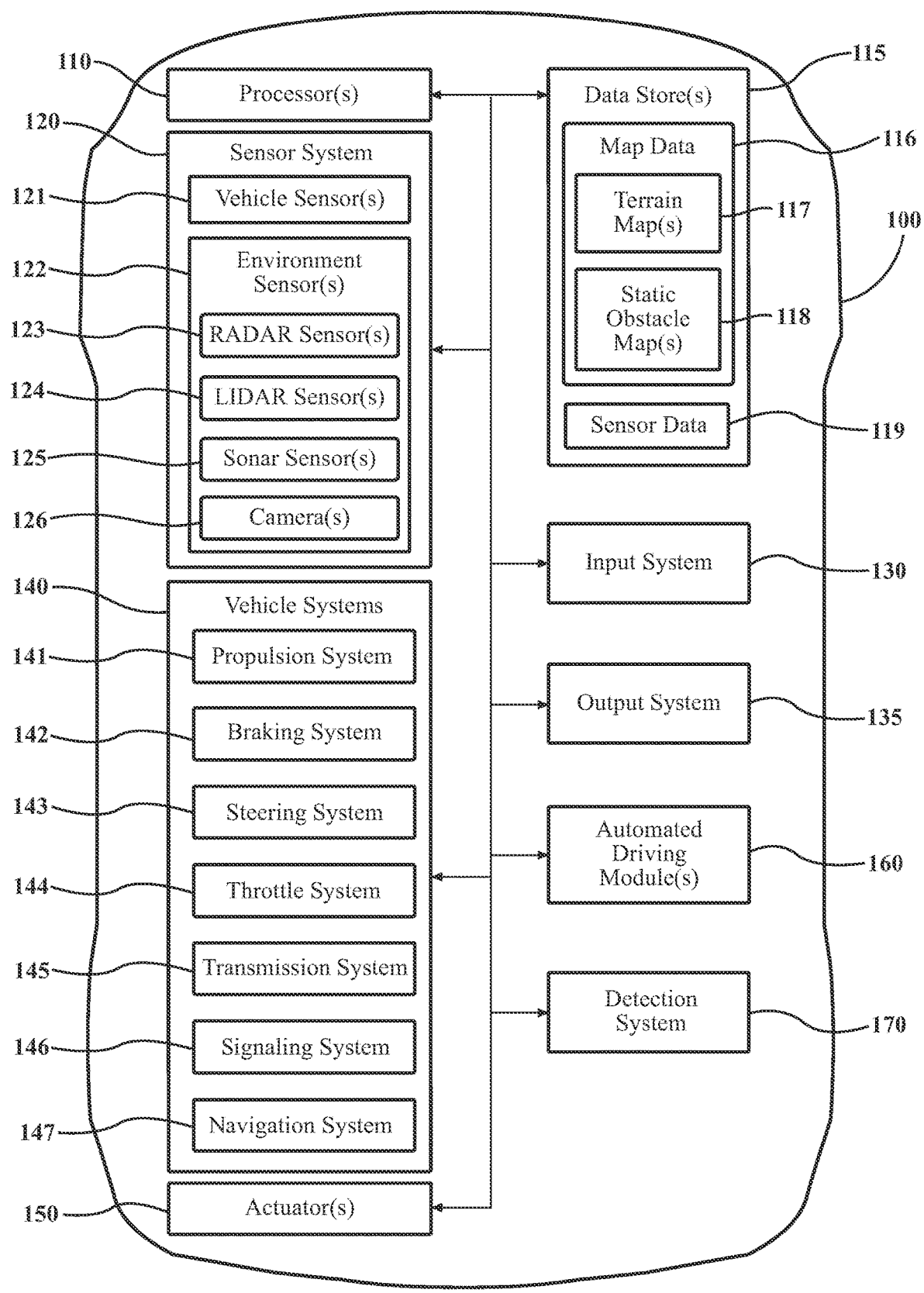
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a detection system 170 uses road-side units (RSU), consumer electronics (CE), mobile devices, robots, drones, and so on that benefit from the functionality discussed herein associated with improving the detection of lanes in a driving scene through segmenting by road regions using an ontology enhanced for deriving semantic context.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a detection system 170 that is implemented to perform methods and other functions as disclosed herein for improving the detection of lanes in a driving scene through segmenting by road regions using an ontology enhanced for deriving semantic context.

Figure 2:
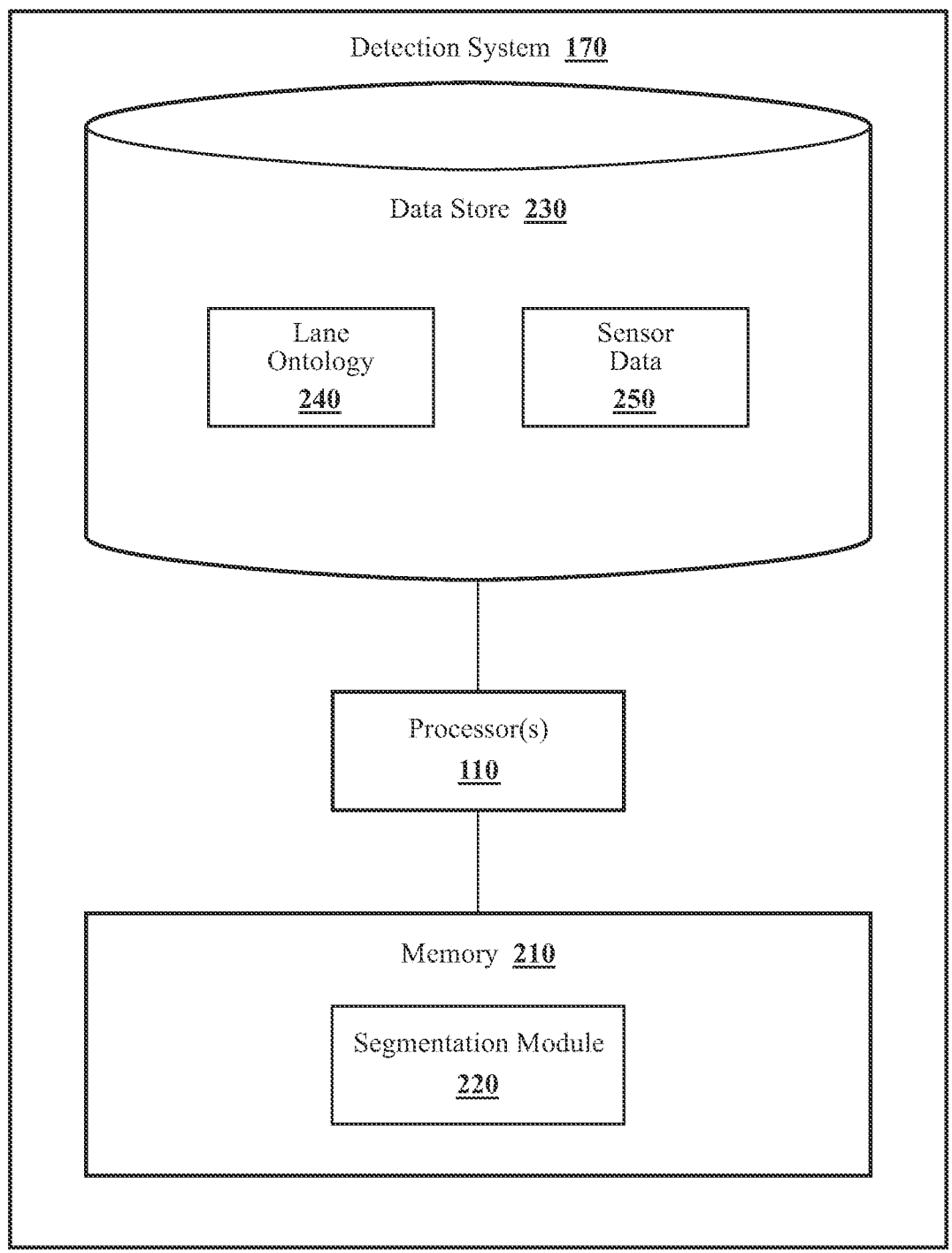
FIG. 2 illustrates one embodiment of a detection system that is associated with identifying lanes in a driving scene through segmenting by road regions using an ontology.

With reference to FIG. 2, one embodiment of the detection system 170 of FIG. 1 is further illustrated. The detection system 170 is shown as including a processor(s) 110 from the vehicle 100 of FIG. 1. Accordingly, the processor(s) 110 may be a part of the detection system 170, the detection system 170 may include a separate processor from the processor(s) 110 of the vehicle 100, or the detection system 170 may access the processor(s) 110 through a data bus or another communication path. In one embodiment, the detection system 170 includes a memory 210 that stores a segmentation module 220. The memory 210 is a random-access memory (RAM), a read-only memory (ROM), a hard-disk drive, a flash memory, or other suitable memory for storing the segmentation module 220. The segmentation module 220 is, for example, computer-readable instructions that when executed by the processor(s) 110 cause the processor(s) 110 to perform the various functions disclosed herein.

Moreover, the segmentation module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the segmentation module 220, in one embodiment, acquires the sensor data 250 that includes at least images from a camera. In further arrangements, the segmentation module 220 acquires the sensor data 250 from further sensors such as radar sensors 123, LIDAR sensors 124, and other sensors as may be suitable for identifying vehicles and locations of the vehicles.

Accordingly, the segmentation module 220, in one embodiment, controls the respective sensors to provide the data inputs in the form of the sensor data 250. Additionally, while the segmentation module 220 is discussed as controlling the various sensors to provide the sensor data 250, in one or more embodiments, the segmentation module 220 can employ other techniques to acquire the sensor data 250 that are either active or passive. For example, the segmentation module 220 may passively sniff the sensor data 250 from a stream of electronic information provided by the various sensors to further components within the vehicle 100. Moreover, the segmentation module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In various implementations, the detection system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the segmentation module 220 in executing various functions. In one embodiment, the data store 230 includes the sensor data 250 along with, for example, metadata that characterizes various aspects of the sensor data 250. For example, the metadata can include location coordinates (e.g., longitude and latitude), relative map coordinates or tile identifiers, time/date stamps from when the separate sensor data 250 was generated, and so on.

Furthermore, in one embodiment, the data store 230 further includes the lane ontology 240 used for segmenting an image to derive 3D context. This context may be inferred from lane lines and road regions. The ontology may define pixels using an improved approach given in Table 1.

TABLE 1

| Value | Segment | Description |
| --- | --- | --- |
| 0 | Void | Defines background pixels. |
| 1 | Ego-lane | Defines pixels of a lane or a road region having the ego vehicle. |
| 2 | Left-lane | Defines pixels of an adjacent lane or region to the ego-lane from the left. |
| 3 | Right-lane | Defines pixels of an adjacent lane or region to the ego-lane from the right. |
| 4 | Bi-directional Lane | Defines pixels of a bidirectional lane or region. |
| 5 | Parallel-lanes | Defines pixels of remaining (multiple) road regions with the same direction as ego/left/right lanes. |
| 6 | Oncoming-lanes | Defines pixels of the (multiple) road regions with an opposite direction to the ego-lane. |
| 7 | Left-lane Left-Lane Line | Defines lane marker pixels for the left-lane boundary of the left-lane. |
| 8 | Ego-lane Left-Lane Line | Defines lane marker pixels for the left-lane boundary of the ego-lane. |
| 9 | Ego-lane Right-Lane Line | Defines lane marker pixels for the right-lane boundary of the ego-lane. |
| 10 | Right-lane Right-lane Line | Defines lane marker pixels for the right-lane boundary of right-lane. |
| 11 | Intersection | Defines pixels in the region of an intersection. The boundaries could be stop lines, curbs, physical barriers, and so on. |

Here, pixel values on the road for a driving scene derived through segmentation are used by the detection system 170 to determine 3D context. For example, the detection system 170 estimates context by learning relations (e.g., distance, position, etc.) between lane lines, road regions, lane regions, and intersection pixels using the ontology in Table 1. In one approach, this includes inferring line and region shapes.

Figure 3A:
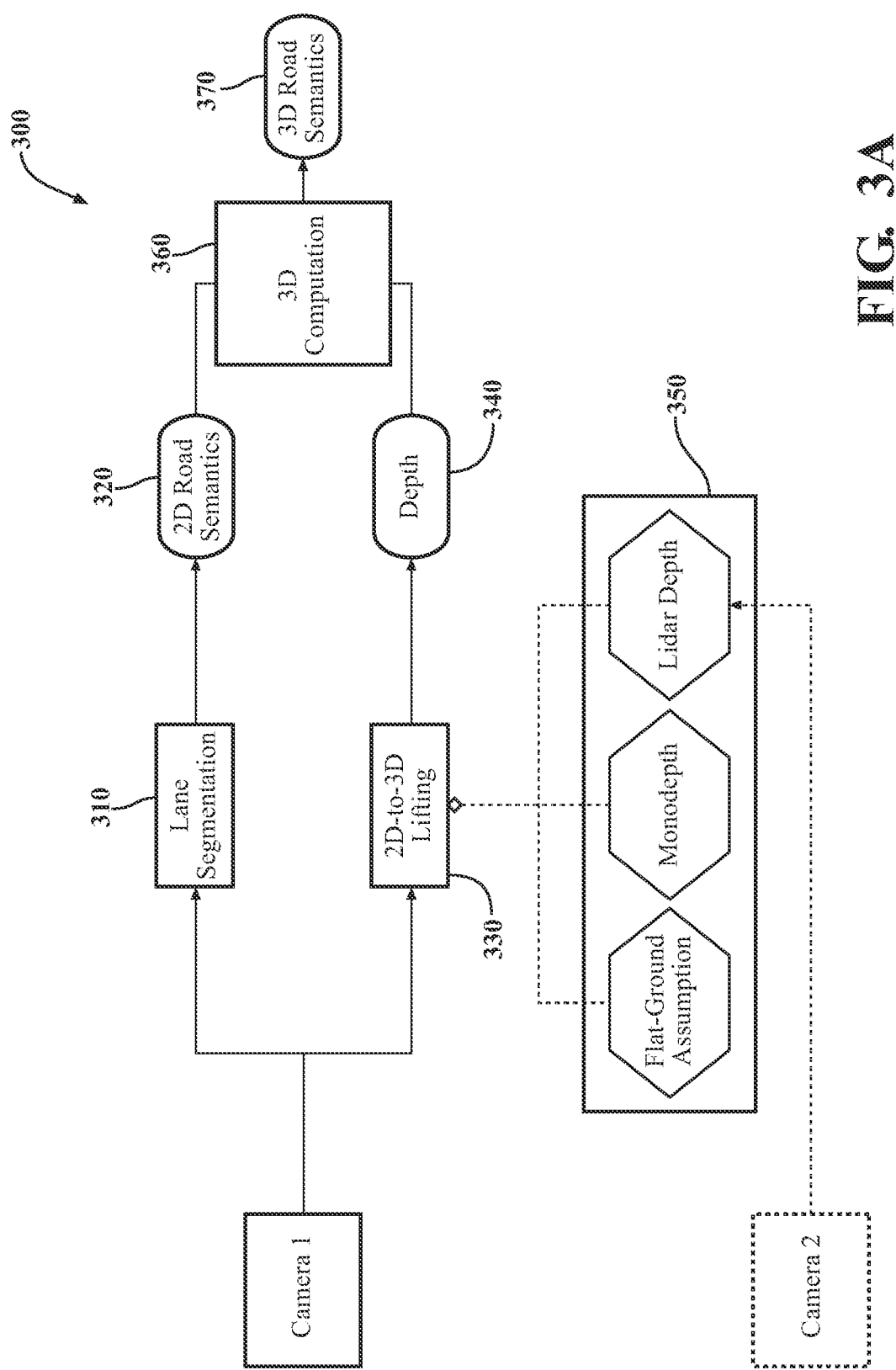
FIG. 3A illustrates one embodiment of the detection system segmenting an image from a camera by lane lines and road regions defined by the ontology.

The segmentation module 220, in one embodiment, is further configured to perform additional tasks beyond controlling the respective sensors to acquire and provide the sensor data 250. For example, the segmentation module 220 includes instructions that cause the processor 110 to segment a monocular image and compute depth for detecting lanes using the ontology in Table 1 enhanced for semantic context. In one approach, FIG. 3A illustrates the detection system 170 segmenting an image from a camera(s) by lane lines and road regions 300 defined by the ontology and independent of map data. Here, the lane segmentation 310 is a model or network (e.g., a learning network, a neural network, regression model, etc.) that processes an image from a camera (e.g., a monocular camera) and applies the ontology in Table 1 for enhancing lane line and road region identification by pixel.

In one approach, the lane segmentation 310 uses a residual network (ResNet) backbone trained to classify segmented pixels using the ontology defined in Table 1. In this way, the detection system 170 avoids using polynomial line, keypoint, splines, bounding boxes, and so on approaches. This gives computation flexibility for diverse lane shapes, complex lane boundaries, and atypical road topologies. As such, the lane segmentation 310 computes and outputs 2D context that defines pixels, such as by class or category, within the image according to the ontology in Table 1. For instance, a class and estimated depth are for a pixel subset within a road region occupied by other vehicles or objects that the detection system 170 infers from the 2D context and other depth information.

In addition, the 2D-to-3D lifting 330 is a model or network (e.g., a learning network, a neural network, a regression model, etc.) that outputs the depth 340 representing 3D information derived from the same image of Camera 1 used by the lane segmentation 310. Here, the depth 340 can be derived by the detection system 170 using one or more of the depth operations 350 for individual pixels. As such, the depth operations 350 allow the detection system 170 to distinguish a road, lane lines, a vehicle, and so on pixel-by-pixel. For example, the detection system 170 computes that a road pixel has more depth than a pixel from a flat rear of a bus in a driving scene.

Regarding the depth operations 350, the detection system 170 uses a flat-ground assumption, mono-depth, or LIDAR depth according to sensors installed on the vehicle 100. The ground in a driving scene is represented as a flat plane for the flat-ground assumption. As such, the detection system 170 projects the 3D information from camera calibration and the map data 116 having road information without online estimation to compute the depth 340. For applications demanding accuracy, mono-depth processing estimates the depth 340 from a single monocular image from Camera 1 by using a deep learning network, a model trained by SFM, and so on. Furthermore, LIDAR depth is an operation that uses data from the LIDAR sensors 124 including Camera 2 when installed on the vehicle 100. Here, the 2D-to-3D lifting 330 uses LIDAR points in the network to estimate the depth 340.

Moreover, the detection system 170 computes the 3D road semantics 370 by inputting the 2D road semantics 320 and the depth 340 to the 3D computation 360 head in FIG. 3A. The 3D road semantics 370 represent lane information including locations of lane lines, road regions, lane regions, and relations among different types or classes within a same image or frame for 3D context. For lane line classes, the detection system 170 may learn type attributes as solid, dashed, bott dot, physical boundary (e.g., curbs, guard rails, etc.), and so on. Attributes for layers on the road may include single line, double line, and so on. Furthermore, colors can include white, yellow, red, and so on. The 3D road semantics 370 allow downstream tasks such as automated driving to understand the road relative to the vehicle 100. In one approach, an automated driving module(s) 160 uses the 3D context to predict motion by the surrounding road participants such as other vehicles, bicyclists, and so on. A planning module of the vehicle 100 can similarly use the 3D road semantics 370 to plan a safe and comfortable travel path.

Figure 3B:
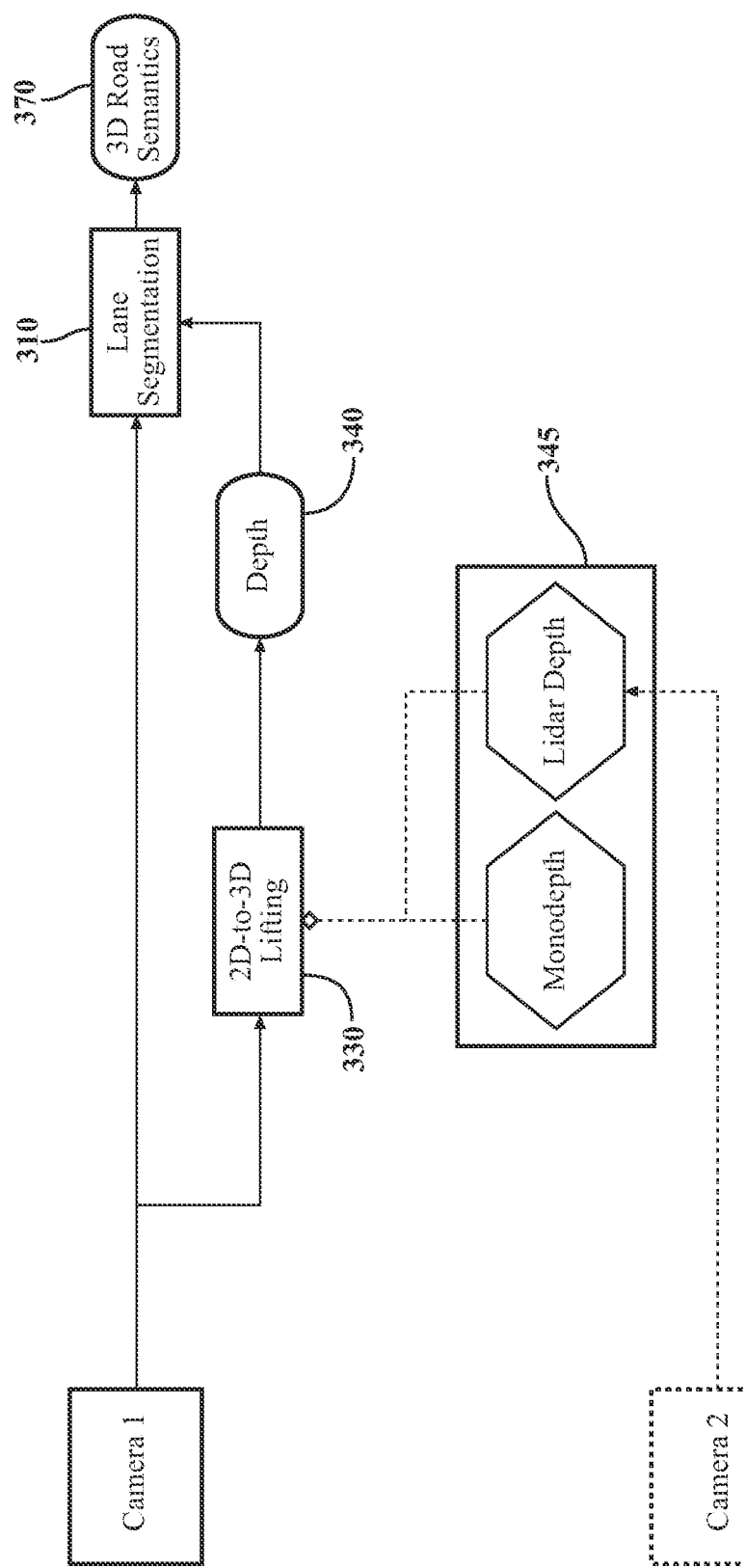
FIG. 3B illustrates one embodiment of the detection system segmenting an image from a camera using integrated depth computations and the ontology.

Regarding FIG. 3B, the lane segmentation 310 model or network (e.g., a learning network, a neural network, a regression model, etc.) uses an image and the depth 340 to output class and depth pixel-by-pixel independent of map data. Here, the class and depth represent the 3D road semantics 370 for complex road topologies since the depth operations 345 excludes the flat-ground assumption approach. The system in FIG. 3B prevents classifying objects as road semantics by using the depth 340 during segmentation computations. The detection system 170 also avoids having an extra head for the 3D computation 360. However, the detection system 170 may implement the system in FIG. 3A for applications demanding the 2D road semantics 320 without depth information, thereby improving flexibility in certain applications.

Figure 4A:
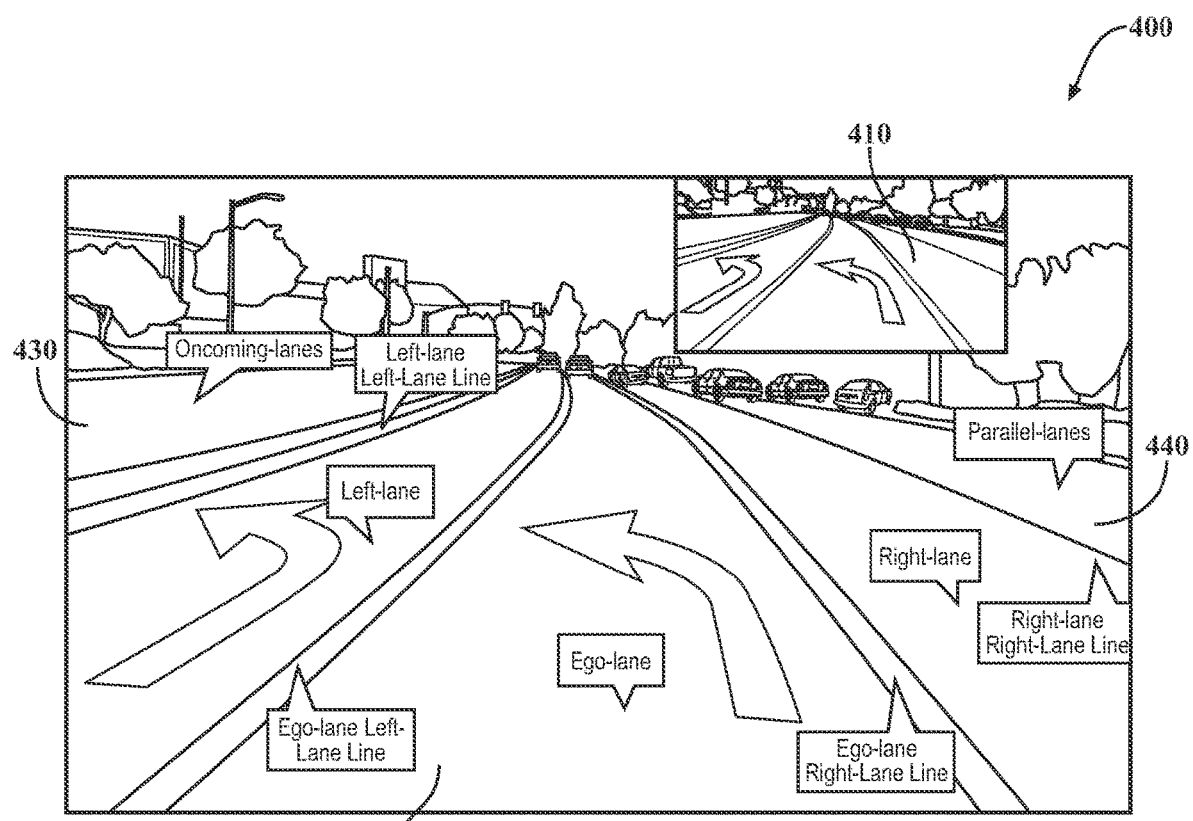
FIG. 4A illustrates an example of the ontology enhanced with an ego region, ego lines, and surrounding regions.
Figure 4B:
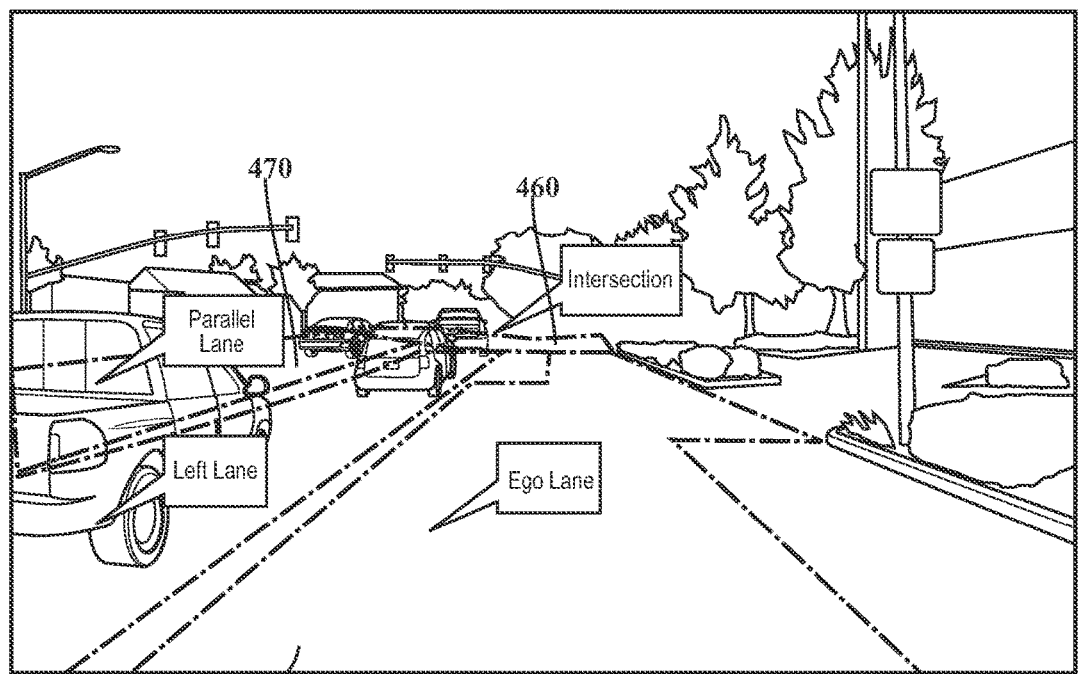
FIG. 4B illustrates an example of the detection system identifying shapes of the ego region and the surrounding regions using the ontology.

Now turning to FIGS. 4A and 4B, an example of the ontology enhanced with an ego region, ego lines, and surrounding regions 400 is illustrated. The image or frame 410 is a view of a driving scene. The detection system 170 segments the image or frame 410 to identify lanes and associated relationships beyond lane lines using the ontology from Table 1. In one approach, the detection system 170 uses both lane lines (e.g., lane markings) and road region classes to derive underlying contextual relationships pixel-by-pixel. As previously explained, the detection system 170 may learn type attributes as solid, dashed, bott dot, physical boundary (e.g., curbs, guard rails, etc.), and so on for lane line classes. Attributes for layers on the road may include single line, double line, and so on. Furthermore, colors can include white, yellow, red, and so on. For example, the detection system 170 uses the system in FIG. 3A to locate the ego-lane 420 since there is a road region between two consecutive lane-lines that are white or yellow. In addition, the lines are separated by a minimum distance set according to governmental regulations or standards. Here, the 3D road semantics 370 may communicate this scenario as {8, Ego-lane Left-Lane Line, 1, Ego-lane, 9, Ego-lane Right-Lane Line} with related pixel location and depth of an instance for downstream processing. For instance, the automated driving module(s) 160 computes a distance gap, predicts velocity, and so on using the 3D road semantics 370. This information can be augmented by distinguishing the oncoming-lanes 430 and the parallel lanes 440 in the driving scene that the automated driving module(s) 160 uses in risk computations for certain maneuvers.

Other scenarios may involve the detection system 170 deriving context using relations such as a lane line existing between two neighboring lanes; a right lane-line of a left-lane is a left lane-line of an ego-lane; a left lane-line of a left-lane is a right lane-line of an ego-lane. The detection system 170 can use the ontology in Table 1 to communicate the first and third scenarios as vectors or strings {2, 8, 1} and 7<->9 for processing by downstream tasks. Similarly, the second scenario can be represented textually as "a right lane-line of a left-lane is a left lane-line of an ego-lane" to assist downstream tasks. Furthermore, the detection system 170 processes road semantics and pixel depth to identify abnormal relations between road regions relative to a driving lane using the ontology in Table 1. For example, a parallel-lane (5) between a left-lane (2) and an ego-lane (1) is defined by the ontology as an abnormal condition. A bike-lane in between a left-lane (2) and an ego-lane (1) may be defined as another abnormal or anomalous road condition. As such, a safety system of the vehicle 100 may factor the abnormal condition in risk calculations to assist or warn an operator.

Regarding FIG. 4B, the detection system 170 may use the 2D road semantics 320 and the depth 340 to infer 3D context and shapes of the ego-lane 450, the intersection 460, and the parallel-lane 470. Here, the 3D context and shapes of these lanes allow downstream systems to understand complex and atypical topologies, thereby improving automated navigation, safety assistance, and so on. For example, the vehicle 100 tracks position according to the 3D road semantics 370 and changes in the shape of the ego-lane 450, a left-lane, and a bike lane.

In various implementations, the detection system 170 generates a HD map using the semantics for areas without the map data by pixel comparisons. For example, pixel coordinates and depth are compared between the ego-lane 450 and the intersection 460. The detection system 170 infers a shape of the ego-lane 450 and the intersection 460 from this information to construct a detailed segment of the HD map. As such, a downstream system can execute a maneuver for the vehicle 100 using the HD map and the 3D context by an automated driving system (ADS) estimating object location within the driving scene. In this way, the detection system 170 improves automation and map capabilities while balancing system resources by applying the ontology in Table 1 for semantic segmentation.

Figure 5:
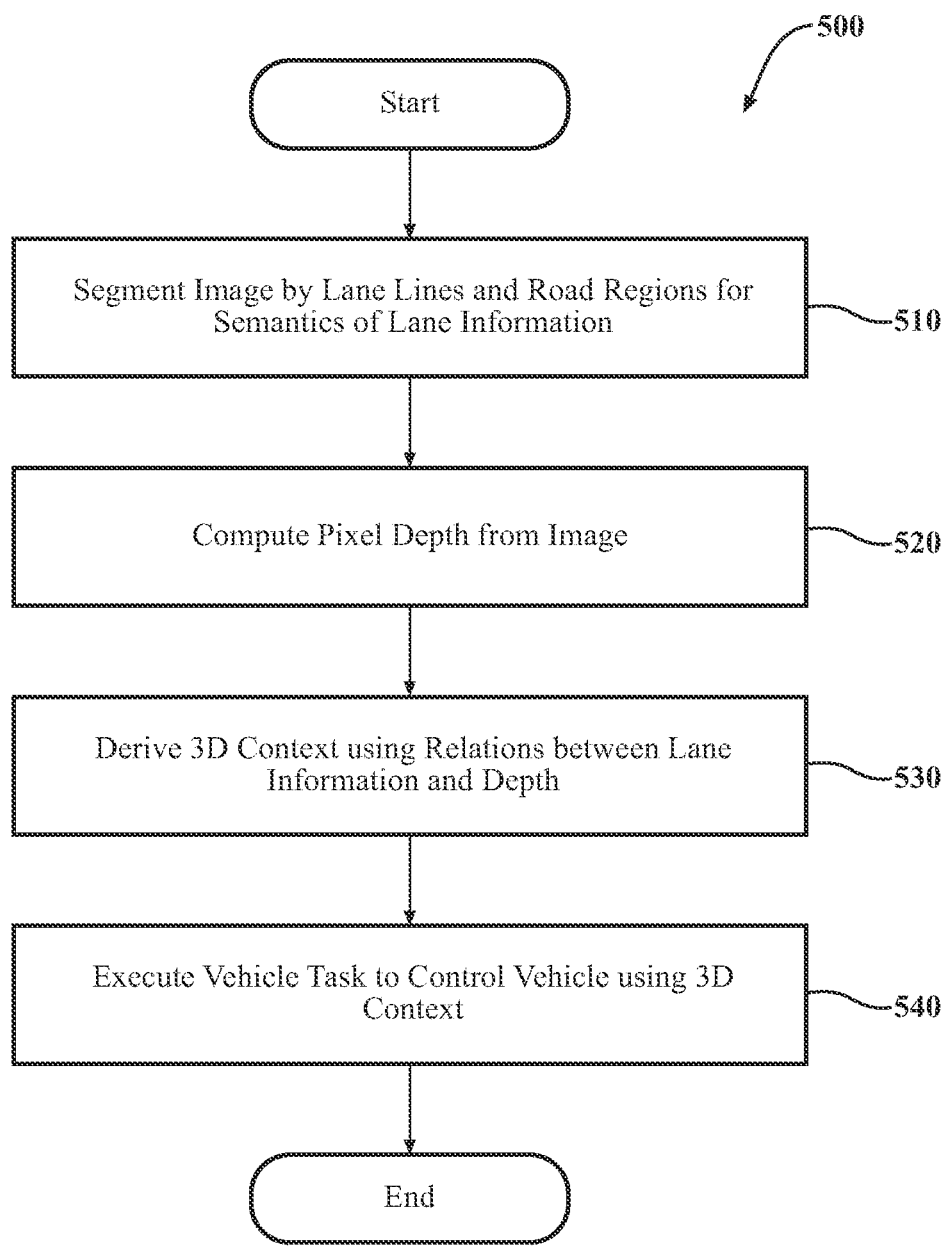
FIG. 5 illustrates one embodiment of a method that is associated with segmenting an image using the ontology enhanced to derive three-dimensional (3D) context from lane relationships.

Regarding FIG. 5, a flowchart of a method 500 that is associated with segmenting an image using the ontology enhanced to derive 3D context from lane relationships and depth is illustrated. Method 500 will be discussed from the perspective of the detection system 170 of FIGS. 1 and 2. While method 500 is discussed in combination with the detection system 170, it should be appreciated that the method 500 is not limited to being implemented within the detection system 170 but is instead one example of a system that may implement the method 500.

At 510, the segmentation module 220 segments an image by lane lines and road regions for inferring semantics of lane information. This computation may execute without direct map data. Here, the detection system 170 may acquire an image or frame from Camera 1 and transform the information into a vehicle frame for improving the processing of a driving scene. In particular, the pixel values for the driving scene are derived through segmentation according to the ontology in Table 1. For example, a lane line and road region are assigned a semantic value pixel-by-pixel. As previously explained, the detection system 170 can arrange the values in a vector or string describing relationships between various lane lines and road regions. Downstream systems can use the vector to execute tasks such as object detection and motion planning.

At 520, the detection system 170 or the segmentation module 220 compute depth using the image by a separate 2D-to-3D lifting operation or as part of segmentation operations. In one approach, the detection system 170 derives depth for individual pixels to distinguish a road, lane lines, a vehicle, and so on pixel-by-pixel. For example, a road pixel has more depth than a pixel from a flat rear of a bus in a driving scene. The detection system 170 can use one or more of a flat-ground assumption, mono-depth, or LIDAR depth for depth computations according to sensors installed on the vehicle 100.

Moreover, the ground in a driving scene is represented as a flat plane for the flat-ground assumption. As previously explained, the detection system 170 can project the 3D information from camera calibrations and map data having road information without online estimation to compute depth in this way. For applications demanding accuracy, mono-depth estimates the depth from a single monocular image of Camera 1. This may involve using a deep learning network, a model trained by SFM, and other learning models. Furthermore, LIDAR depth is an operation that uses data from the LIDAR sensors 124 including Camera 2 when installed on the vehicle 100. Here, a 2D-to-3D lifting operation can use LIDAR points in the network to estimate depth.

At 530, the detection system 170 derives 3D context using relations between lane information and depth. For example, the detection system 170 estimates context by learning relations between lane lines, road regions, lane regions, and intersection pixels using the ontology in Table 1. In one approach, the semantic context is 2D context before processing depth information by pixel for deriving 3D context using the 3D computation 360 head. The detection system 170 may also compute the 3D context while performing segmentation by integrating depth operations, thereby avoiding having an extra head for the 3D computation 360.

Regarding contextual relations, the detection system 170 identifies lanes and associated relationships beyond lane lines using the ontology from Table 1 as follows. As previously explained, the detection system 170 can use both lane line (e.g., lane markings) and road region classes to derive underlying contextual relationships pixel-by-pixel. Learned type attributes may include solid, dashed, bott dot, physical boundary (e.g., curbs, guard rails, etc.), and so on for lane line classes. Attributes for layers on the road may include single line, double line, and so on. Furthermore, colors can include white, yellow, red, and so on. As such, the detection system 170 locates an ego-lane since there is a road region between two consecutive lane-lines that are of different colors (e.g., white, yellow, etc.). In one approach, the lane-lines are separated by a minimum distance set according to governmental regulations or standards that the computation factors. A vector for this scenario may be {8, Ego-lane Left-Lane Line, 1, Ego-lane, 9, Ego-lane Right-Lane Line} with related pixel location and depth of an instance associated with a single frame.

Other scenarios may involve the detection system 170 deriving context using relations such as a lane line existing between two neighboring lanes and a left lane-line of a left-lane is a right lane-line of an ego-lane. As such, the detection system 170 can use the ontology in Table 1 to represent and communicate these scenarios as {2, 8, 1} and 7<->9 for processing by downstream tasks. Furthermore, the detection system 170 processes road semantics and pixel depth to identify abnormal relations between road regions relative to a driving lane using the ontology in Table 1. For example, a parallel-lane (5) between a left-lane (2) and an ego-lane (1) is an abnormal condition. A bike-lane in between a left-lane (2) and an ego-lane (1) may also be defined as an abnormal or anomalous road condition according to the ontology and semantic inferences.

At 540, the vehicle 100 executes a vehicle task for control using the 3D context. An example of a vehicle task is object detection or motion planning. For instance, the automated driving module(s) 160 computes a distance gap, predicts velocity, and so on using the 3D road semantics 370. This information can be augmented by distinguishing the oncoming-lanes and the parallel lanes in the driving scene that the automated driving module(s) 160 uses in risk computations for certain maneuvers. Regarding abnormal conditions, a safety system of the vehicle 100 can factor these conditions in risk calculations to assist or warn a vehicle operator.

Moreover, the vehicle task may be generating a map online. As previously explained, the detection system 170 generates a HD map using the semantics for areas without the map data by comparing coordinates and depth pixel-by-pixel between an ego-lane, lane lines, and other road regions (e.g., intersection, oncoming-lane, etc.). In one approach, the detection system 170 infers the shape of the ego-lane and other regions from this information to construct a detailed segment of the HD map. As such, the vehicle 100 executes a maneuver using the HD map and the 3D context by an ADS estimating object location within the driving scene. Accordingly, the detection system 170 improves system performance and compatibility while balancing system resources by applying the ontology in Table 1 for semantic segmentation and inferring 3D context using depth operations.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the detection system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140 and, thus, may be partially or fully autonomous as defined by the society of automotive engineers (SAE) levels 0 to 5.

The processor(s) 110, the detection system 170, and/or the automated driving module(s) 160 can be operatively connected to communicate with the various vehicle systems 140 and/or individual components thereof. For example, returning to FIG. 1, the processor(s) 110, the detection system 170, and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140.

The processor(s) 110, the detection system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the detection system 170, and/or the automated driving module(s) 160 can control the direction and/or speed of the vehicle 100. The processor(s) 110, the detection system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A detection system, comprising:
a processor; and
a memory storing instructions that, when executed by the processor, cause the processor to:
segment an image of a driving scene, independent of maps about the driving scene, by lane lines and road regions defined by an ontology and a pixel subset from the image has semantics of lane information from the ontology;
compute pixel depth from the image for the lane lines and the road regions using a model by lifting information from the image having two-dimensional (2D) data;
derive 3D context using relations between the semantics and the pixel depth, and the relations infer a driving lane for a vehicle from types of the lane lines and the road regions adjacent to the driving lane; and
execute a task to control the vehicle on the driving lane using the 3D context.

2. The detection system of claim 1, further including instructions to identify the relations using the semantics by classifying the driving lane according to detected pixels for two of the lane lines, wherein the semantics are two-dimensional (2D) semantics and the lane lines include a solid line within a predetermined distance.

3. The detection system of claim 2, further including instructions to:
estimate a shape of the road regions from the image according to the types using the semantics, wherein the image is a single frame from a monocular camera; and
track a position of the vehicle according to the 3D context and changes in the shape.

4. The detection system of claim 1, wherein the instructions to compute the pixel depth further include instructions to lift pixels of the image from 2D information to 3D individually according to the semantics using one of a flat-ground assumption, a model trained by a structure-from-motion (SFM) operation, and light-detection and ranging (LIDAR) data.

5. The detection system of claim 1, wherein the ontology defines classes for one of a line color, a number of line layers, line types, lane boundaries, intersections, and physical boundaries.

6. The detection system of claim 1, wherein the instructions to segment the image further include instructions to output a class from the ontology and an estimated depth for the pixel subset using the semantics and the pixel depth, wherein the pixel subset has the road regions associated with the driving lane that are occupied.

7. The detection system of claim 1, wherein the instructions to derive the 3D context further include instructions to estimate the 3D context using a depth model that processes the semantics and the pixel depth to identify abnormal relations between the road regions relative to the driving lane.

8. The detection system of claim 1, further including instructions to:
generate a high-definition (HD) map using the semantics for areas without map data by comparing pixels between a first lane region and a second lane region from the road regions; and
execute a maneuver by an automated driving system (ADS) for the vehicle using the HD map and the 3D context to estimate object location within the driving scene.

9. The detection system of claim 1, wherein the model uses one of a flat-ground assumption, a learning network, and light-detection and ranging (LIDAR) data according to a type of the driving scene.

10. A non-transitory computer-readable medium comprising:
instructions that when executed by a processor cause the processor to:
segment an image of a driving scene, independent of maps about the driving scene, by lane lines and road regions defined by an ontology and a pixel subset from the image has semantics of lane information from the ontology;
compute pixel depth from the image for the lane lines and the road regions using a model by lifting information from the image having two-dimensional (2D) data;
derive 3D context using relations between the semantics and the pixel depth, and the relations infer a driving lane for a vehicle from types of the lane lines and the road regions adjacent to the driving lane; and
execute a task to control the vehicle on the driving lane using the 3D context.

11. The non-transitory computer-readable medium of claim 10, further including instructions to identify the relations using the semantics by classifying the driving lane according to detected pixels for two of the lane lines, wherein the semantics are two-dimensional (2D) semantics and the lane lines include a solid line within a predetermined distance.

12. A method comprising:
   segmenting an image of a driving scene, independent of maps about the driving scene, by lane lines and road regions defined by an ontology and a pixel subset from the image has semantics of lane information from the ontology;
   computing pixel depth from the image for the lane lines and the road regions using a model by lifting information from the image having two-dimensional (2D) data;
   deriving 3D context using relations between the semantics and the pixel depth, the relations infer a driving lane for a vehicle from types of the lane lines and the road regions adjacent to the driving lane; and
   executing a task to control the vehicle on the driving lane using the 3D context.

13. The method of claim 12, further comprising identifying the relations using the semantics by classifying the driving lane according to detected pixels for two of the lane lines, wherein the semantics are two-dimensional (2D) semantics and the lane lines include a solid line within a predetermined distance.

14. The method of claim 13, further comprising:
   estimating a shape of the road regions from the image according to the types using the semantics, wherein the image is a single frame from a monocular camera; and
   tracking a position of the vehicle according to the 3D context and changes in the shape.

15. The method of claim 12, wherein computing the pixel depth further includes lifting pixels of the image from 2D information to 3D individually according to the semantics using one of a flat-ground assumption, a model trained by a structure-from-motion (SFM) operation, and light-detection and ranging (LIDAR) data.

16. The method of claim 12, wherein the ontology defines classes for one of a line color, a number of line layers, line types, lane boundaries, intersections, and physical boundaries.

17. The method of claim 12, wherein segmenting the image further includes outputting a class from the ontology and an estimated depth for the pixel subset using the semantics and the pixel depth, wherein the pixel subset has the road regions associated with the driving lane that are occupied.

18. The method of claim 12, wherein deriving the 3D context further includes estimating the 3D context using a depth model that processes the semantics and the pixel depth to identify abnormal relations between the road regions relative to the driving lane.

19. The method of claim 12, further comprising:
   generating a high-definition (HD) map using the semantics for areas without map data by comparing pixels between a first lane region and a second lane region from the road regions; and
   executing a maneuver by an automated driving system (ADS) for the vehicle using the HD map and the 3D context to estimate object location within the driving scene.

20. The method of claim 12, wherein the model uses one of a flat-ground assumption, a learning network, and light-detection and ranging (LIDAR) data according to a type of the driving scene.

* * * * *